United States Patent
Griffioen et al.

(10) Patent No.: US 11,909,185 B2
(45) Date of Patent: Feb. 20, 2024

(54) INSTALLING A CABLE INTO A DUCT

(71) Applicant: Plumettaz Holding S.A., Bex (CH)

(72) Inventors: Willem Griffioen, Ter Aar (NL);
Alexandre Uhl, Nyon (CH);
Christophe Gutberlet, Montreux (CH)

(73) Assignee: Plumettaz Holding S.A., Bex (CH)

( * ) Notice: Subject to any disclaimer, the term of this patent is extended or adjusted under 35 U.S.C. 154(b) by 811 days.

(21) Appl. No.: 16/976,961

(22) PCT Filed: Apr. 3, 2019

(86) PCT No.: PCT/EP2019/058401
§ 371 (c)(1),
(2) Date: Aug. 31, 2020

(87) PCT Pub. No.: WO2019/193049
PCT Pub. Date: Oct. 10, 2019

(65) Prior Publication Data
US 2020/0395743 A1    Dec. 17, 2020

(30) Foreign Application Priority Data

Apr. 3, 2018    (CH) .................................. 00432/18

(51) Int. Cl.
*H02G 1/08* (2006.01)
*F16L 55/40* (2006.01)
(Continued)

(52) U.S. Cl.
CPC .............. *H02G 1/086* (2013.01); *F16L 55/40* (2013.01); *H02G 1/10* (2013.01); *F16L 2101/50* (2013.01)

(58) Field of Classification Search
CPC ............ H02G 1/086; H02G 1/10; H02G 1/08; H02G 1/081; H02G 1/083; H02G 1/088;
(Continued)

(56) References Cited

U.S. PATENT DOCUMENTS

| 10,199,807 B2* | 2/2019 | Fitzgerald | .............. H02G 1/086 |
| 10,305,266 B2* | 5/2019 | Griffioen | ................ H02G 1/086 |
| 2011/0042631 A1* | 2/2011 | Tahara | .................... H02G 1/086 |
| | | | 254/134.4 |

FOREIGN PATENT DOCUMENTS

| DE | 4011265 A1 | 10/1991 |
| DE | 4112185 A1 | 10/1992 |

(Continued)

OTHER PUBLICATIONS

Foreign Communication from a Related Counterpart Application, International Search Report and Written Opinion dated May 17, 2019, International Application No. PCT/EP2019/058401 filed on Apr. 3, 2019.

(Continued)

*Primary Examiner* — Seahee Hong
(74) *Attorney, Agent, or Firm* — Conley Rose P.C.

(57) ABSTRACT

Method for installing a cable into a duct, comprising the steps of:
  determining a maximum pressure,
  setting a leaking mode of a leaking plug to start at a leaking pressure drop equal to or lower than the maximum pressure,
  attaching the leaking plug to a foremost end of the cable,
  introducing the foremost end of the cable into the duct,
  supplying a pressurized liquid into the duct:
    at a supply port, and
    at a supply pressure,
    so that the cable is pulled by the leaking plug,
  before the foremost end has reached the second extremity, exceeding the leaking pressure drop at a location close to the leaking plug.

13 Claims, 5 Drawing Sheets

(51) Int. Cl.
*H02G 1/10* (2006.01)
*F16L 101/50* (2006.01)

(58) Field of Classification Search
CPC ....... F16L 55/40; F16L 55/26; F16L 2101/50;
G02B 6/4463; G02B 6/4465
See application file for complete search history.

(56) References Cited

FOREIGN PATENT DOCUMENTS

| | | |
|---|---|---|
| DE | 69902050 T2 | 3/2003 |
| EP | 0445858 A1 | 9/1991 |
| WO | 2011054551 A2 | 5/2011 |
| WO | 2015082276 A1 | 6/2015 |
| WO | 2015121493 A1 | 8/2015 |
| WO | 2019193049 A1 | 10/2019 |

OTHER PUBLICATIONS

Foreign Communication from a Related Counterpart Application, Swiss Search Report and Written Opinion dated Jun. 28, 2018, International Application No. CH00432/18 filed on Apr. 3, 2018.

\* cited by examiner

INSTALLING A CABLE INTO A DUCT

CROSS-REFERENCE TO RELATED APPLICATIONS

The present application is a filing under 35 U.S.C. 371 as the National Stage of International Application No. PCT/EP2019/058401, filed Apr. 3, 2019, entitled "INSTALLING A CABLE INTO A DUCT," which claims priority to Swiss Application No. 00432/18 filed with the Intellectual Property Office of Switzerland on Apr. 3, 2018, both of which are incorporated herein by reference in their entirety for all purposes.

The present invention relates to the installation or introduction or laying of a cable into a duct.

Installing a cable into a duct (buried or located undersea) might be done with floating technique. In such technique, the cable is introduced into the duct, and a pressurized liquid is simultaneously introduced, so as to create drag forces along the cable, to propel it into the duct. However, such technique for large power cables introduced in very large ducts requires very high flows, leading to high volumes of liquid to supply at the entry of the duct and to evacuate at the exit of the duct. In addition, high flow pumps are also required.

Installing a cable into a duct (buried or located undersea) might also be done with pulling pigs attached along the cable, to propel the cable with a pulling force generated by the pressurized liquid, but in such case, an excessive pressure might damage the duct (risk of burst), or the cable (risk of rupture). As disclosed in document WO2011054551A2, liquid might be used when pulling pigs are attached to the cable.

The present invention aims to address the above mentioned drawbacks of the prior art, and to propose first a method for installing a cable into a duct, with reduced risks of damaging the duct or the cable and/or lowering the need for liquid supply, while still aiming at laying a cable through a long duct.

In this aim, a first aspect of the invention is a method for installing a cable into a duct having two extremities, the method comprising the steps of:
- determining a maximum pressure based on a bursting or service pressure of the duct and/or on a maximum strength of the cable,
- setting a leaking mode of a leaking plug to start at a leaking pressure drop across the leaking plug determined to be equal to or lower than the maximum pressure,
- attaching the leaking plug to a foremost end of the cable,
- introducing the foremost end of the cable into the duct at a first extremity,
- supplying a pressurized liquid into the duct:
  - at a supply port arranged between the foremost end equipped with the leaking plug and the first extremity, and
  - at a supply pressure equal to or higher than a predetermined pressure,
  - so that the cable is pulled by the leaking plug,
- before the foremost end has reached the second extremity, exceeding the leaking pressure drop at a location close to the leaking plug, leading the leaking mode to start.

In other words, the above method proposes to lay the cable into the duct with a first phase using a pulling technique (with no or almost no leaks at the leaking plug), and second phase using a technique similar to a floating technique (with a significant leak of liquid at the leaking plug). During the first phase, the liquid supply is limited to a flow required to "follow" the cable (therefore, no significant extra flow is needed), and during the second phase, the pressure at the leaking plug side is not greater than the maximum pressure (thus, no overstress is applied to the duct wall or to the cable).

According to an embodiment, the duct presents a trajectory with non constant altitude, and the method comprises a step, before the foremost end has reached the second extremity, of adjusting the supply pressure, so that all along the part of the duct comprised between the first extremity and the foremost end of the cable and filled with liquid, the pressure of the liquid is lower than the maximum pressure. In other words, the predetermined supply pressure is tuned in accordance to the slopes along the duct, and their distance from the entry of the liquid.

Advantageously, the maximum pressure is determined also taking in account an installation temperature and/or an installation time. In other words, the values of bursting or service pressure, being the first parameters taken into account, are depending on the operating temperature and/or the installation time.

Advantageously, the supply pressure is adjusted, so that at any point along the part of the duct comprised between the first extremity and the foremost end of the cable and filled with liquid:
- for points at higher altitude than the first extremity, the supply pressure subtracted with a pressure loss caused by liquid viscosity to reach said considered point, is greater than a hydrostatic pressure caused by the liquid density and a difference of altitude between the altitude of said considered point and the first extremity, and/or
- for points at lower altitude than the first extremity, the supply pressure subtracted with a pressure loss caused by liquid viscosity to reach said considered point, added to the hydrostatic pressure caused by the liquid density and a difference of altitude between the altitude of said considered point and the first extremity is larger than zero and lower than the maximum pressure.

Advantageously, the method further comprises a step of supplying the pressurized liquid at a flow exceeding a leaking flow of the leaking plug, when the leaking mode has started. During the second phase, the leaking plug is significantly opened, so as to allow a real increase of flow to be supplied at the supply port, so as to propel the cable with significant drag forces all along the cable length.

Advantageously, before the leaking mode has started, the pressurized liquid is supplied at a flow $\Phi_v$ as defined in formula:

$$\frac{1}{4}\pi(D_d^2 - D_c^2) \cdot v_{cable} \leq \Phi_V \leq \frac{1.2}{4}\pi(D_d^2 - D_c^2) \cdot v_{cable}$$

where:
$\Phi_v$ is the supplied flow of pressurized liquid (m³/s),
$D_c$ is the external diameter of the cable (m),
$D_d$ is the internal diameter of the duct (m),
$v_{cable}$ is the speed of the cable into the duct (m/s).

According to the above embodiment, during the first phase (before the leaking mode has started, there is no or almost no significant flow of liquid passing through the leaking plug, which is closed or almost closed).

Advantageously:
the two extremities are located at different altitudes, and the foremost end of the cable is introduced at the first extremity of the duct, which is the extremity located at the highest altitude. The foremost end of the cable is introduced at the first extremity of the duct so that a pressure applied at a location close to the leaking plug is gradually increasing due to liquid density and a difference of altitude between the highest altitude of first extremity and an altitude of the foremost end, while the leaking plug moves toward the second extremity located at the lowest altitude. The method is particularly well suited to the laying of cable in a (generally) downhill oriented duct. In other words, the installation is preferably done through the highest extremity to propel the cable to the lowest extremity, as the leaking mode will automatically start when the supplied pressure added to the hydrostatic pressure exceeds the leaking pressure drop, thus protecting the duct and/or the cable from excessive pressure. The method, with intermediate opening allows installing cables with strictly pulling technique (with low liquid need) until the difference of altitude provokes the switch to a leaking mode, to avoid over pressure duct damage.

In summary, an aspect of the invention relates to a method for installing a cable into a duct having two extremities positioned at different altitudes, the method comprising the steps of:
- determining a maximum pressure based on a bursting pressure of the duct and/or on a maximum strength of the cable,
- setting a leaking mode of a leaking plug to start at a leaking pressure drop across the leaking plug determined to be equal to or lower than the maximum pressure,
- attaching the leaking plug to a foremost end of the cable,
- introducing the foremost end of the cable into the duct at the extremity having the highest altitude,
- supplying a pressurized liquid into the duct:
  - at a supply port arranged between the foremost end equipped with the leaking plug and the extremity having the highest altitude, and
  - at a supply pressure equal to or higher than a predetermined pressure,
  - so that the cable is pulled by the leaking plug,
- before the foremost end has reached the lowest altitude extremity, exceeding the leaking pressure drop at a location close to the leaking plug, leading the leaking mode to start.

Advantageously, the supply pressure is set so that:
the supply pressure subtracted with a pressure loss caused by liquid viscosity to reach the foremost end of the cable, added to a hydrostatic pressure caused by the liquid density and a difference of altitude between the altitude of the highest altitude extremity and an altitude of the foremost end of the cable,
is lower than:
the maximum pressure. According to this embodiment, the supply pressure is calculated and limited to avoid any excess of stress along the downhill duct.

Advantageously, the supply pressure is set so that:
the supply pressure subtracted with a pressure loss caused by liquid viscosity to reach the second extremity, added to a hydrostatic pressure caused by the liquid density and a difference of altitude between the two extremities,
is lower than:
the maximum pressure. According to this embodiment, the supply pressure is calculated and limited to avoid any excess of stress along the downhill duct.

Advantageously, the supply pressure is set so that:
the supply pressure subtracted with a pressure loss caused by liquid viscosity to reach a portion of the duct having an altitude lower than the altitude of the second extremity, added to a hydrostatic pressure caused by the liquid density and a difference of altitude between the altitude of the first extremity and an altitude of the portion of the duct having an altitude lower than the altitude of the second extremity,
is lower than:
the maximum pressure. According to this embodiment, the supply pressure is calculated and limited to avoid any excess of stress along the downhill duct, even if the duct presents a portion being located under (at a lower altitude) than the second extremity.

In any case, the predetermined pressure is equal to or higher than a hydrostatic pressure caused by the liquid density and a difference of altitude between the first extremity and an altitude of a portion of the duct having an altitude higher than the altitude of the first extremity. According to this embodiment, the supply pressure is calculated to ensure that the duct will be fully filled with the liquid, even if the duct presents a portion being located above (at a higher altitude) than the first extremity.

Advantageously, the leaking pressure drop is adjusted during the installation, and:
- the leaking pressure drop is increased before or gradually increased during the travelling of the leaking plug through an uphill portion of the duct, or
- the leaking pressure drop is reduced before or gradually reduced during the travelling of the leaking plug through a downhill portion of the duct. According to this embodiment, the leaking plug is (remotely) controlled during installation, to adjust its leaking pressure drop, depending on ascending/descending condition. Reducing the leaking pressure drop is particularly advantageously performed after the leaking plug has reached a portion of the duct being located at a lower altitude than the second extremity, and travels up, having its altitude increasing: this avoids to overstress the duct in its lowest altitude portion.

Advantageously:
if the second extremity positioned at a higher altitude than the first extremity, the supply pressure ($p_{sup}$) is adjusted so that the supply pressure ($p_{sup}$), subtracted with a pressure loss caused by liquid viscosity over all the duct's length and subtracted with the leaking pressure drop ($\Delta p_{leak}$), is equal to a hydrostatic pressure caused by the liquid density and a difference of altitude between the altitude of said second extremity and the first extremity, or
if the second extremity positioned at a lower altitude than the first extremity, the supply pressure ($p_{sup}$) is adjusted so that the supply pressure ($p_{sup}$), subtracted with a pressure loss caused by liquid viscosity over all the duct's length and subtracted with the leaking pressure drop ($\Delta p_{leak}$), and added to a hydrostatic pressure caused by the liquid density and a difference of altitude between the altitude of said second extremity and the first extremity is equal to 0

The above embodiments of adjusting the supply pressure to respect the above conditions ensure to have the duct fully filled with water, even if the trajectory is not at constant altitude, and even if the leaking plug is in the leaking mode.

Advantageously, the method comprises the initial steps of:
- measuring or determining an internal diameter of the duct, an external diameter of the cable, and a slope of the duct between its extremities,
- setting a leaking surface of the leaking plug to be equal to or greater than a surface of a circular hole having a diameter:

$$D_{hole} \geq 1.8 \sqrt{\frac{D_{hydro}^{5/7} \rho_w^{9/14}}{\mu_w^{1/7} \Delta p_{leak}^{1/2}} [g \sin(\alpha)]^{4/7} (D_d^2 - D_c^2)}$$

With:

$$D_{hydro} = \frac{2}{1 + \sqrt{\frac{D_d - D_c}{D_d + D_c}}} (D_d - D_c)$$

where:
$D_c$ is the external diameter of the cable (m)
$D_d$ is the internal diameter of the duct (m)
$\Delta p_{leak}$ is the leaking pressure drop (Pa) across the leaking plug
$\rho_w$ is the density of the pressurized liquid (kg/m³)
$\alpha$ is the average angle of the duct with the horizontal
g is the acceleration of gravity (9.81 m/s²)
$\mu_w$ is the dynamic viscosity of the pressurized liquid (Pas).

According to the above embodiment, the leaking surface is calculated to allow a significant flow of liquid once the leaking mode has started.

Advantageously:

$$D_{hole} \geq 2.1 \sqrt{\frac{D_{hydro}^{5/7} \rho_w^{9/14}}{\mu_w^{1/7} \Delta p_{leak}^{1/2}} [g \sin(\alpha)]^{4/7} (D_d^2 - D_c^2)}.$$

Advantageously, the flow of the pressurized liquid supplied into the duct is:
- set at a first flow value $\Phi_{v1}$ before the leaking mode has started,
- set at a second flow $\Phi_{v2}$ after the leaking mode has started, wherein $\Phi_{v2} \geq 5 \Phi_{v1}$.

In other words, an aspect of the present disclosure relates to a leaking plug or to the use of a leaking plug having a leaking surface to be equal to a surface of a circular hole having a diameter satisfying the below criterion:

$$1.8 \sqrt{\frac{D_{hydro}^{5/7} \rho_w^{9/14}}{\mu_w^{1/7} \Delta p_{leak}^{1/2}} [g \sin(\alpha)]^{4/7} (D_d^2 - D_c^2)} \leq$$

$$D_{hole} \leq 2.1 \sqrt{\frac{D_{hydro}^{5/7} \rho_w^{9/14}}{\mu_w^{1/7} \Delta p_{leak}^{1/2}} [g \sin(\alpha)]^{4/7} (D_d^2 - D_c^2)}$$

If the duct presents an horizontal or almost horizontal trajectory (slope of the duct with horizontal equal to or not greater than 5°), the method comprises the initial steps of:
- measuring or determining an internal diameter of the duct, an external diameter of the cable,
- setting a leaking surface of the leaking plug to be equal to or greater than a surface of a circular hole having a diameter $D_{hole}$:

$$D_{hole} \geq 1.8 \sqrt{\frac{D_{hydro}^{5/7} \rho_w^{9/14}}{\mu_w^{1/7} \Delta p_{leak}^{1/2}} (D_d^2 - D_c^2)}$$

and more preferably:

$$D_{hole} \geq 2.1 \sqrt{\frac{D_{hydro}^{5/7} \rho_w^{9/14}}{\mu_w^{1/7} \Delta p_{leak}^{1/2}} (D_d^2 - D_c^2)}$$

With:

$$D_{hydro} = \frac{2}{1 + \sqrt{\frac{D_d - D_c}{D_d + D_c}}} (D_d - D_c)$$

where:
$D_c$ is the external diameter of the cable (m),
$D_d$ is the internal diameter of the duct (m),
$\Delta p_{leak}$ is the leaking pressure drop (Pa) across the leaking plug,
$\rho_w$ is the density of the pressurized liquid (kg/m³),
$\mu_w$ is the dynamic viscosity of the pressurized liquid (Pas).

Advantageously:

$$1.8 \sqrt{\frac{D_{hydro}^{5/7} \rho_w^{9/14}}{\mu_w^{1/7} \Delta p_{leak}^{1/2}} (D_d^2 - D_c^2)} \leq D_{hole} \leq 2.1 \sqrt{\frac{D_{hydro}^{5/7} \rho_w^{9/14}}{\mu_w^{1/7} \Delta p_{leak}^{1/2}} (D_d^2 - D_c^2)}$$

With:

$$D_{hydro} = \frac{2}{1 + \sqrt{\frac{D_d - D_c}{D_d + D_c}}} (D_d - D_c)$$

where:
$D_c$ is the external diameter of the cable (m),
$D_d$ is the internal diameter of the duct (m),
$\Delta p_{leak}$ is the leaking pressure drop (Pa) across the leaking plug,
$\rho_w$ is the density of the pressurized liquid (kg/m³),
$\mu_w$ is the dynamic viscosity of the pressurized liquid (Pas).

Advantageously, the method comprises a step of changing a pump used to supply the pressurized liquid before the leaking mode starts.

Advantageously, the method comprises:
- a step of measuring a pressure at a location close to the leaking plug during installation,
- a step of correcting the supply pressure according to the measured pressure at a location close to the leaking plug.

Other features and advantages of the present invention will appear more clearly from the following detailed description of particular non-limitative examples of the invention, illustrated by the appended drawings where.

Figure 1:
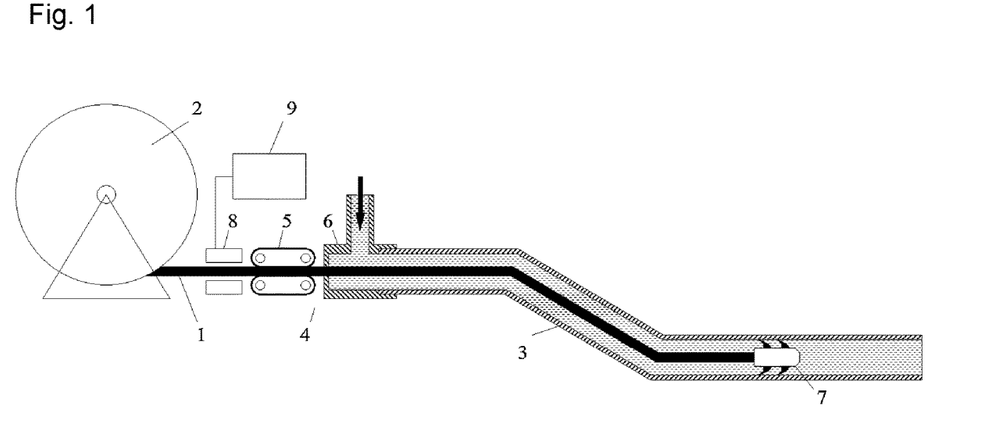
FIG. 1 represents a general view of an installation of a cable into a duct, using the method according to the invention.

FIG. 1 shows a general and schematic view of the installation of a cable 1 into a duct 3. The cable 1 is installed from a reel 2 into a duct 3 by means of a device 4 comprising drive belts 5, liquid injection chamber 6 (here water) and leaking plug 7.

To properly propel the cable 1 into the duct 3, a leaking plug 7 is attached to the foremost end of the cable 1, and after introduction in the duct 3, water is injected under pressure into the duct 3, via the water injection chamber 6, thus creating a pressure force onto the leaking plug 7, so as to pull the cable into the duct 3. Advantageously, there is only one single pig or leaking plug 7 attached to the cable 1.

Figure 2:
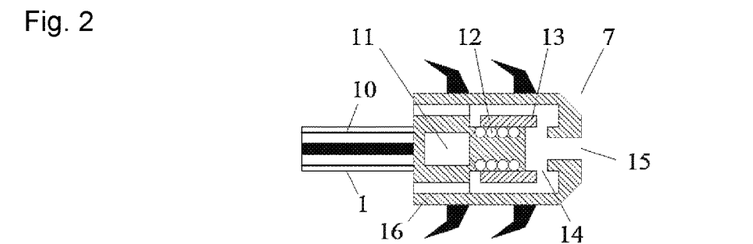
FIG. 2 represents an example of a pulling pig which can be used during the installation shown FIG. 1.

FIG. 2 shows a detailed view of a preferred embodiment of the leaking plug 7. A communication signal is coupled to cable 1 (which typically comprises electric shielding wires 10) with inductive device 8 controlled by electronics 9. The electric shielding wires 10 of the cable can e.g. be used to pick up and transport said signal. This signal is then connected to a battery operated electronics 11 arranged in the leaking plug 7 which controls a solenoid 12 which operates a cylindrical valve 13, varying the size of an opening 14. This opening 14 is placed in series with openings 15 and 16, enabling opening or closing of the leaking plug.

Optionally also a force sensor can be mounted between the cable 1 and the leaking plug 7 (not drawn), included in the monitoring. Optionally, a pressure sensor might be incorporated, so that a local pressure at the leaking plug 7 vicinity can be measured and analysed.

The cylindrical valve 13 can totally block the opening 14, so that the leaking plug 7 is not leaking between its rear end (where cable 1 is attached) and its opposite font end. The leaking plug 7 is said to be operated in a non leaking mode. In contrast, the opening 14 can be totally opened, and in such case, the leaking plug 7 is said to be operated in a leaking mode.

In the leaking mode, depending on the size of the holes and openings through which the liquid passes, a pressure drop will be generated. This pressure drop will be hereinafter called leaking pressure drop $\Delta p_{leak}$.

According to another embodiment not drawn, the leaking plug 7 can comprise a valve which is not electrically controlled, but only pushed in the closed position by a spring having its preload adjustable before introduction in the duct 3. Upon liquid pressure, the spring can be pushed, so as to open the valve and lead the leaking plug to leak. Preloading of the spring will determine (in advance) the leaking pressure drop $\Delta p_{leak}$.

According to yet another embodiment the spring can be pushed by the (pulling) force between the cable and the leaking plug, opening at a preset force (or pressure drop $\Delta p_{leak}$).

A first aspect of the disclosure relates to the use of the leaking plug 7 to install the cable 1 with two phases. In first phase, the working mode of the installation is generally pulling. In this first mode, the leaking plug is (almost) not leaking, and the cable 1 is pulled due to the pressure force generated on the leaking plug due to the water pressure.

After a significant distance or after passage of several turns or bends, the pressure force is compensated either by friction forces, or by capstan effect, so that the maximum distance reachable with the first (non leaking) mode is achieved.

The first aspect of the disclosure proposes to switch from the first mode to a second mode, corresponding to a floating technique. In this aim, the leaking plug 7 before its insertion has been set to become leaky if a predetermined pressure (hereafter called "leaking pressure drop" or $\Delta p_{leak}$) is applied. In other words, the leaking plug 7 becomes leaky if it is subjected to a pressure difference between its front side and its rear side which is greater than the predetermined leaking pressure drop $\Delta p_{leak}$.

Thus, the installation method comprises a step of increasing the pressure of the liquid to force the leaking plug 7 to leak, and then a significant increase of flow is generated, so that the injected liquid creates drag forces along the full length of the cable 1, thereby allowing the cable 1 to be further installed into the duct 3.

In other words, during the first phase, the flow of liquid is limited to the minimum, to just follow the leaking plug (being in a non-leaking mode, so that there is no significant difference of speed between the liquid and the cable 1) and once the maximum distance is reached with this non leaking mode, the pressure is increased to force the leaking plug 7 to pass into a leaking mode during which the flow is significantly increased, thus creating drag forces all along the cable 1, thereby increasing the achievable distance of installation.

In detail, during the first phase, the liquid flow $\Phi_v$ is defined in formula:

$$\Phi_V \le \frac{1.2}{4}\pi(D_d^2 - D_c^2) \cdot v_{cable}$$

where:
$\Phi_v$ is the supplied flow of pressurized liquid (m³/s),
$D_c$ is the external diameter of the cable (m),
$D_d$ is the internal diameter of the duct (m),
$V_{cable}$ is the speed of the cable into the duct (m/s).

If the leaking plug 7 is in a strictly non leaking mode the flow $\Phi_v$ is defined in formula:

$$\Phi_V \le 1/4\pi(D_d^2 - D_c^2) \cdot v_{cable}$$

During the second phase, the liquid flow is multiplied by a factor of at least 2 and preferably 5, to generate enough drag forces. Advantageously, the method can comprise a step of changing the pump (or adding a 2nd pump) supplying the liquid: during the first phase, the first pump presents "low" flow and "medium or high" pressure capacity, during the second phase, the second pump presents "high" flow and no reduced pressure capacity.

The leaking plug 7 is set to become leaking at a leaking pressure drop $\Delta p_{leak}$ which is chosen to be lower than or equal to a maximum pressure defined in considering the characteristics of the duct 3. In other words, the duct 3 presents a pressure above which it might be damaged, even leading to bursting, and the maximum pressure is defined accordingly. The maximum pressure is chosen to be lower than the bursting pressure of the duct, and might of course be chosen taking a safety factor into consideration to be safely lower than the maximum pressure. The operation temperature and operation time are also taken into consideration for this.

A second aspect of the disclosure is the use of the leaking plug 7 in a non leaking mode or in a leaking mode when the duct 3 presents a trajectory which is not horizontal, i.e. the duct 3 has a non constant altitude.

In such case, the invention proposes specific strategies for laying the cable 1 into the duct 3, with the leaking plug 7 in a non-leaking mode or in a leaking mode. In other words, depending on the duct trajectory, the invention proposes to set specific supply pressure and/or specific leaking pressure drop $\Delta p_{leak}$ to the leaking plug 7.

Figure 3:
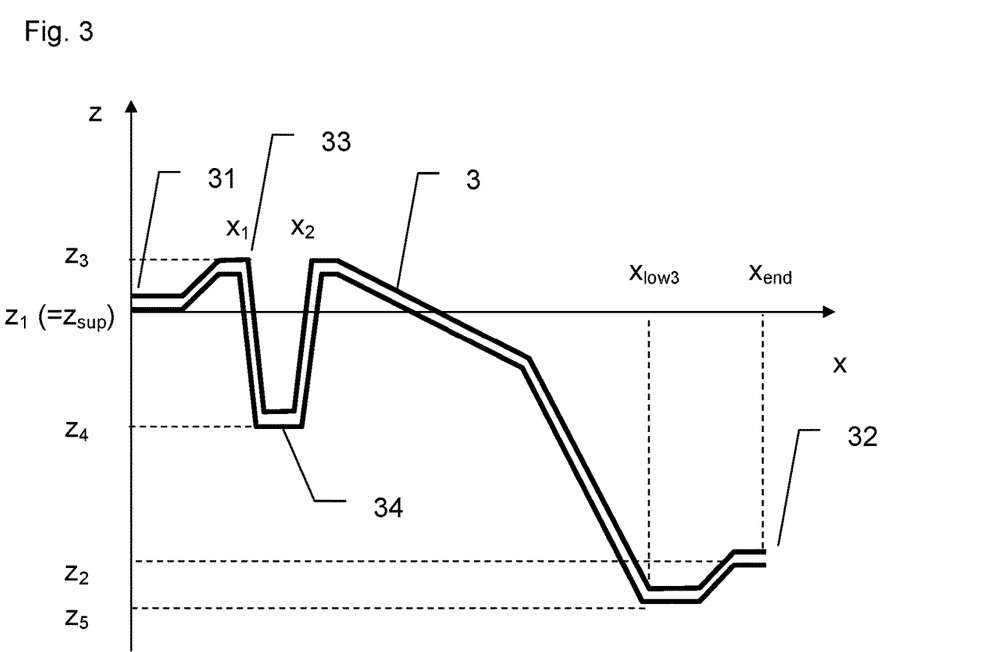
FIG. 3 represents an example of trajectory of the duct of FIG. 1, with the evolution of the pressure inside the duct along its length.

In particular, in the case of a trajectory as shown on FIG. 3, the duct 3 presents a first extremity 31 at a first altitude $z_1$, and a second extremity 32 at a second altitude $z_2$, being lower than altitude $z_1$. However, a first part of the duct 3 presents a positive slope, to reach an intermediate point 33 at a third altitude $z_3$ around position $x_1$, being greater than altitude $z_1$. Then, the duct 3 presents a negative slope to reach an intermediate point 34, being located at a fourth altitude $z_4$, being lower than altitude $z_1$.

The duct 3 then reaches again altitude $z_3$ around position $x_2$, to then reach the lowest altitude $z_5$ at position $x_{low3}$, before second extremity 32. According to a preferred embodiment of the method, the supply of the liquid and introduction of cable 1 into duct 3 is done though the first extremity, which has the highest altitude. In present case, the highest extremity is the first extremity 31, at a first altitude $z_1$, hereafter called altitude $z_{sup}$ (for liquid supply).

In the following, a horizontal pressure $p_{sup}$ is defined as the pressure that would be present in the duct 3 if it was horizontal. At the liquid supply port this pressure is equal to the supply pressure $p_{sup}$ and then drops according to the viscous flow of the liquid and also makes a further step down after passing the leaking plug 7, with leaking pressure difference set to $\Delta p_{leak}$.

For the duct 3 filled with water until the second extremity 32, $p_{hor}(x)$ is given by:

$$p_{hor}(x) = p_{sup} - \frac{x}{x_{end}}\Delta p_{visc}$$

along the duct section with cable $$p_{hor}(x) = p_{sup} - \frac{x}{x_{end}}\Delta p_{visc} - \Delta p_{leak}$$

along the duct section without cable (after the leaking plug 7)

Here x is the coordinate describing the position in the duct, being 0 at the supply port, first extremity 31, and $x_{end}$ at the end of the duct, second extremity 32. $\Delta p_{visc}$ is the total viscous pressure drop caused by the flowing liquid:

$$\frac{\Delta p_{visc}}{x_{end}} = 0.24 \frac{\mu_w^{1/4}\rho_w^{3/4}}{D_{hydro}^{5/4}(D_d^2 - D_c^2)^{7/4}}\Phi_V^{7/4}$$

Here $\Phi_V$ is the volume flow, $D_d$ the diameter of the duct, $D_c$ the diameter of the cable, $\mu_w$ the dynamic viscosity of liquid (0.0011 Pas for water), $\rho_w$ the density of liquid (1000 kg/m$^3$ for water) and $D_{hydro}$ the hydraulic diameter.

In case the trajectory is sloped (i.e. the duct trajectory follows varying altitude), the hydrostatic pressure $p_{hydr}$ has to be taken into account, as the duct 3 is subjected to an effective pressure $p_{eff}$, which varies with the hydrostatic pressure $p_{hydr}$.

This can be done adding the hydrostatic pressure $p_{hydr}$ to the horizontal pressure $p_{hor}$. The hydrostatic pressure $p_{hydr}$ supply hydr with respect to the is equal to $$p_{hydr} = -\rho_w g(z_x - z_{sup}),$$

with $z_x$ and $z_{sup}$ the elevations (positive is up) at location x and the supply port, respectively. It is easier graphically to define the hydrostatic height function $\rho_w g(z_x - z_{sup})$, which then needs to be subtracted from the horizontal pressure $p_{hor}$ to obtain the effective duct pressure along the duct section with cable $p_{eff}$:

$$p_{eff}(x) = p_{hor}(x) - \rho_w g(z_x - z_{sup})$$

Figure 4:
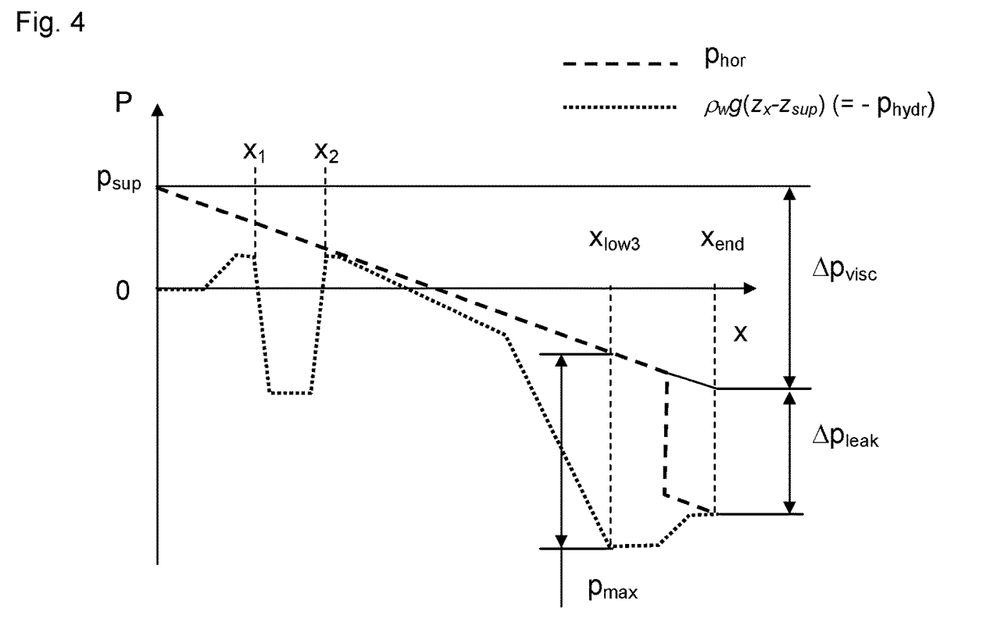
FIG. 4 represents pressure profiles for installation of a cable into the duct of FIG. 3, according to a first scenario.

FIG. 4 shows the hydrostatic height function $\rho_w g(z_x - z_{sup})$ and the horizontal pressure $p_{hor}$ when installing cable 1 into the duct 3 of FIG. 3, according to a first scenario. The hydrostatic height function $\rho_w g(z_x - z_{sup})$ has the same profile as the duct 3 trajectory. The effective pressure $p_{eff}$ along the duct section with cable is simply obtained by the vertical distance between the curve of horizontal pressure $p_{hor}$ and the hydrostatic height function $\rho_w g(z_x - z_{sup})$, having its maximum at the point $x_{low3}$ and being null at the second extremity 32 at position $x_{end}$ as this extremity is at atmospheric pressure.

Note: when the leaking plug 7 is just still inside the duct 3, the volume in front of the leaking plug 7 is at atmospheric pressure; when the leaking plug 7 comes out, the whole situation changes as the liquid can freely leak.

Note also that from the latter boundary condition $\Delta p_{visc}$ can be calculated (and from that the flow):

$$\Delta p_{visc} = p_{sup} - \rho_w g(z_2 - z_{sup}) - \Delta p_{leak}$$

According to the invention, the supply pressure $p_{sup}$ and the leaking pressure $\Delta p_{leak}$ across the leaking plug 7 are both set such that the horizontal pressure $p_{hor}$ is everywhere above the hydrostatic height function $\rho_w g(z_x - z_{sup})$:

$$p_{eff}(x) \geq 0 \text{ or } p_{hor}(x) \geq \rho_w g(z_x - z_{sup}) \tag{1}$$

The maximum pressure $p_{max}$ is indicated, in the lowest point at location $x_{low3}$, (the right depression in the elevation profile). This pressure shall not be higher than the maximum pressure the duct 3 can withstand (which might be chosen as either its regular service pressure, or burst pressure with a safety factor, taking in account the operating temperature, and/or the installation time). In general, everywhere in the duct shall apply:

$$p_{eff}(x) \geq p_{max} \text{ or } p_{hor}(x) - \rho_w g(z_x - z_{sup}) \leq p_{max} \tag{2}$$

Note that equation (2) cannot be fulfilled when depressions exist with a "depth" $h_{depression}$ (on both sides) which leads to a $\rho_w g h_{depression}$ greater than the maximum pressure $p_{max}$.

Note also that the supply pressure at entry $p_{sup}$ is chosen to be just sufficient so that the horizontal pressure $p_{hor}$ is tangent or just above the hydrostatic pressure $p_{hydr}$ at location $x_2$, to ensure that the viscous losses will not prevent the leaking plug 7 to pass this point.

Figure 5:
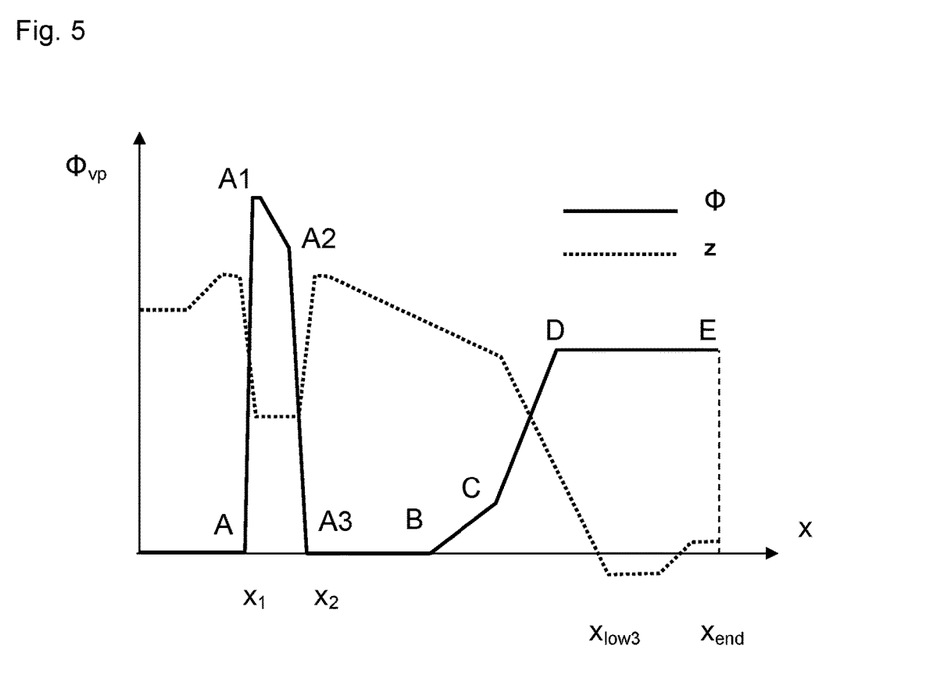
FIG. 5 represents the flow of liquid passing through the pulling pig during the installation of the cable into the duct of FIG. 3, according to the first scenario.

FIG. 5 shows the flow $\Phi_{V_p}$ passing through the leaking plug 7 as a function of position x of the leaking plug 7 in the duct 3. The elevation profile of the duct 3 is given as a reference in the dotted line, showing altitude z, on a different scale.

Different positions of the leaking plug 7 are indicated in capital letters. Until A the pressure over the leaking plug 7 is smaller than the set max pressure, so the leaking plug 7 is the non leaking mode, so that the flow $\Phi_V$ passing through the leaking plug 7 is almost zero.

Then, when reaching point A the leaking plug 7 opens and rapidly a large flow $\Phi_{V_p}$ follows, until maximum flow $\Phi_{V_p}$ at A1 when the leaking plug 7 first touches the bottom of the dip in the duct (position $X_1$), the flow $\Phi_V$ decreasing a little when the leaking plug 7 follows the profile of the dip in the duct 3 until point A2.

Then the flow $\Phi_{V_p}$ rapidly decreases until zero at A3 when the dip in the duct 3 starts to be filled up (in front of the leaking plug 7). The position of A2 and how fast the flow decreases (the position of A3) depends on the maximum flow through the duct 3 and the volume of the duct 3 in the dip. Next the flow $\Phi_V$ remains zero again as the altitude z increases, for some time until leaking plug 7 position B.

Then the leaking plug 7 opens again and the flow $\Phi_V$ increases. Arriving at C the flow $\Phi_{V_p}$ increases faster on the more steep part of the duct trajectory. Arriving at D the flow $\Phi_{V_p}$ reaches its maximum, until the leaking plug 7 arrives at the exit of the duct 3, point E at $X_{end}$.

Figure 6:
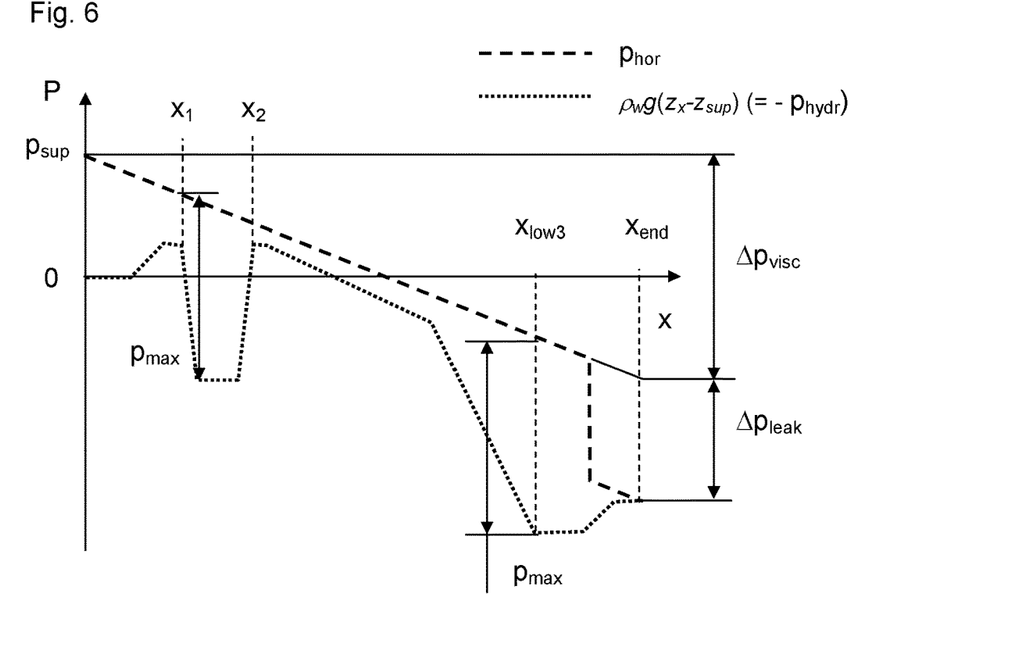
FIG. 6 represents pressure profiles for installation of a cable into the duct of FIG. 3, according to a second scenario.

FIG. 6 shows the hydrostatic height function $\rho_w g(z_x - z_{sup})$ and the horizontal pressure $p_{hor}$ when installing cable 1 into the duct 3 of FIG. 3, according to a second scenario. The situation is sketched for the special case where $p_{sup}$ and $\Delta p_{leak}$ are set such that the effective pressure $p_{eff}$ just reaches the maximum pressure $p_{max}$ at both depressions (at location $x_1$ and at location $x_{low3}$) in the elevation profile of the duct trajectory. Equations (1) and (2) are still obeyed. In order to do so, the pressure at the supply port $p_{sup}$ is set a bit higher than in FIG. 4, the leaking pressure across the leaking plug $\Delta p_{leak}$ set a bit smaller and a larger viscous pressure drop $\Delta p_{visc}$ follows (i.e. a larger flow). In this case, the operating conditions are maximized to possibly install the cable 1 quicker than with the conditions of FIG. 4.

Figure 7:
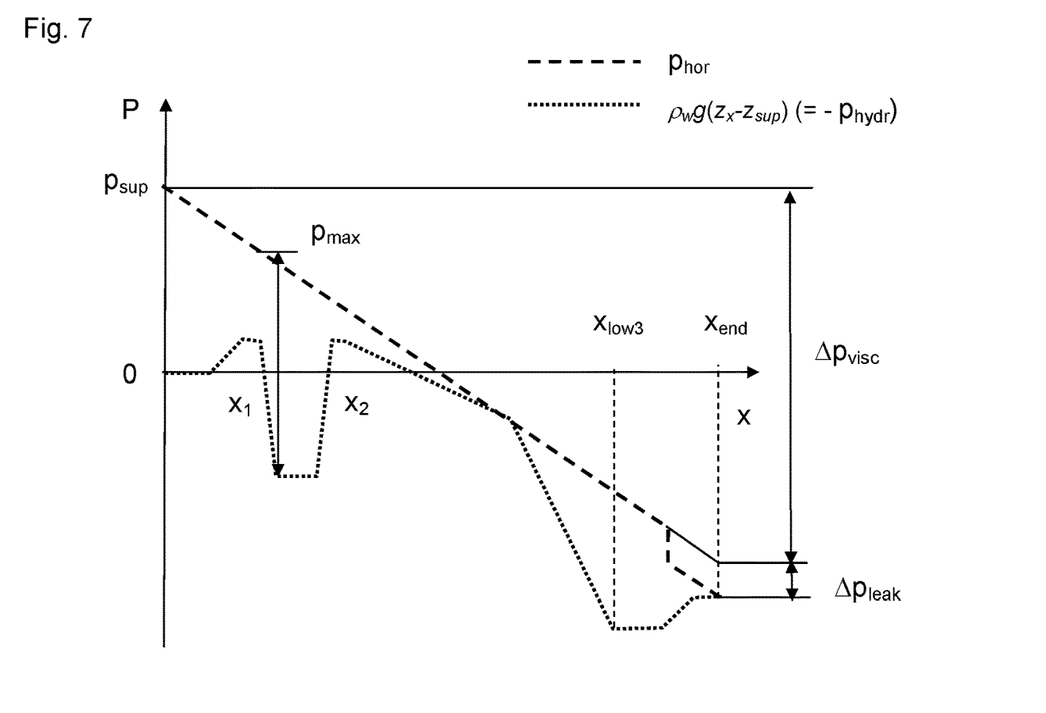
FIG. 7 represents pressure profiles for installation of a cable into the duct of FIG. 3, according to a third scenario.

FIG. 7 represents the hydrostatic height function $\rho_w g(z_x - z_{sup})$ and the horizontal pressure $p_{hor}$ when installing cable 1 into the duct 3 of FIG. 3, according to a third scenario. The situation is sketched for the case where supply pressure $p_{sup}$ and leaking pressure across the leaking plug $\Delta p_{leak}$ are set such that the effective pressure $p_{eff}$ just reaches the maximum pressure $p_{max}$ in the left depression (at location $x_1$ and $x_2$) in the elevation profile of the duct trajectory. Equations (1) and (2) are again still obeyed. Now, the pressure at the supply port $p_{sup}$ is set still a further bit higher than in FIG. 4, the leaking pressure drop across the leaking plug $\Delta p_{leak}$ set a further bit smaller and a further larger viscous pressure drop $\Delta p_{visc}$ follows (i.e. a still larger flow).

Note that it is also possible to set the supply pressure $p_{sup}$ and leaking pressure across the leaking plug $\Delta p_{leak}$ such that the viscous pressure drop $\Delta p_{visc}$ is minimized (i.e. a smaller flow).

Figure 8:
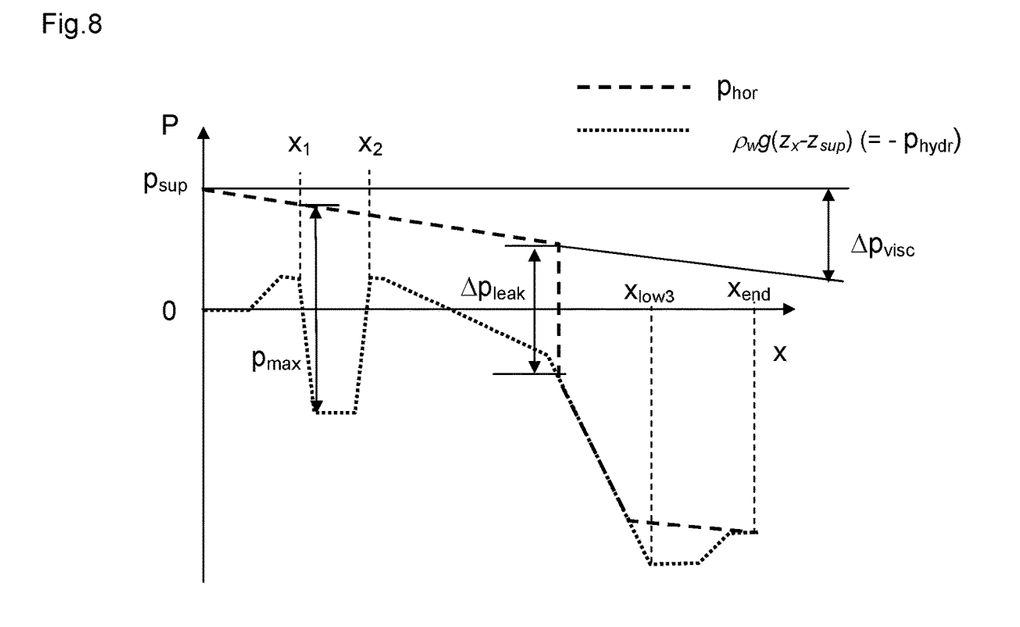
FIG. 8 represents pressure profiles for installation of a cable into the duct of FIG. 3, according to a fourth scenario.

FIG. 8 represents the hydrostatic height function $\rho_w g(z_x - z_{sup})$ and the horizontal pressure $p_{hor}$ when installing cable 1 into the duct 3 of FIG. 3, according to a fourth scenario. The same pressure at the supply port $p_{sup}$ and the same leaking pressure difference $\Delta p_{leak}$ across the leaking plug 7 are set as in FIG. 4, but now the leaking plug 7 is positioned at the location that the effective pressure $p_{eff}$ in the duct 3 just reaches the maximum pressure $p_{max}$ in the local left depression (at location $x_1 - x_2$). The viscous pressure drop $\Delta p_{visc}$ will be smaller here than in FIG. 4. In this case the duct 3 downstream the leaking plug 7 will not be entirely filled with liquid anymore (here water), as the steep slope in this downhill area would require a larger flow than fed in the part of the duct 3 filled with cable 1 and liquid. The effective pressure $p_{eff}$ immediately after the leaking plug 7 will then be zero. The horizontal pressure $p_{hor}$ downstream the leaking plug 7 indicates a water flow not entirely filling the duct and at zero effective pressure $p_{eff}$ during a first part. Then the point is reached where the horizontal pressure $p_{hor}$ line meets the hydrostatic height function $\rho_w g(z_x - z_{sup})$ line, as here the duct 3 is fully filled with liquid again and also the effective pressure $p_{eff}$ can become nonzero again. In case the leaking plug 7 would just start leaking (and no liquid was present in the duct 3 downstream the leaking plug 7) it would not make a difference for the (relevant) cable 1 and liquid filled part of the duct 3 (upstream of the leaking plug 7).

Figure 9:
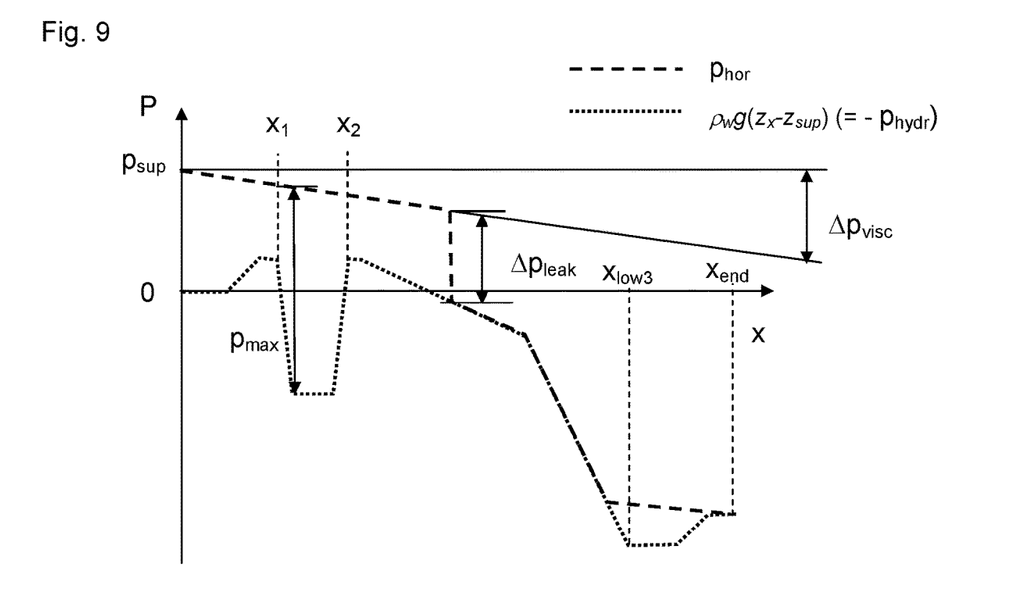
FIG. 9 represents pressure profiles for installation of a cable into the duct of FIG. 3, according to a fifth scenario.
Figure 10:
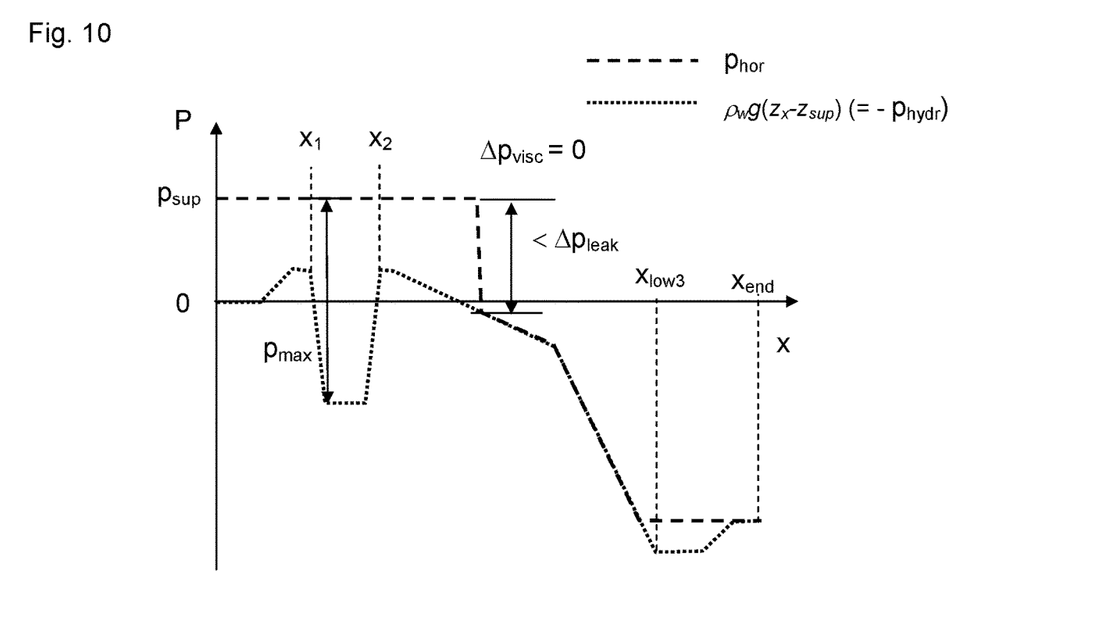
FIG. 10 represents pressure profiles for installation of a cable into the duct of FIG. 3, according to a sixth scenario.

In FIG. 9 the leaking plug 7 is closer to the supply port 31 than in FIG. 8. Now the settings of FIG. 4 cannot be maintained anymore. In this case the leaking pressure difference $\Delta p_{leak}$ of the leaking plug 7 is set smaller. In FIG. 10 the position of the leaking plug 7 is the same as in FIG. 9, but now the settings of the leaking plug 7 are not changed, but the pressure at the supply port $p_{sup}$ is reduced, again such that equation (2) is fulfilled and maximum pressure $p_{max}$ is not exceeded. In this case the pressure at which the leaking plug 7 starts leaking is not reached yet (no leaking mode). Consequently, there is no flow and zero viscous pressure drop $\Delta p_{visc}$ over the duct 3.

However, as soon as the effective pressure becomes equal to the maximum pressure $p_{max}$, the leaking plug 7 will become leaking, to avoid any damage of the duct 3.

It is of course understood that obvious improvements and/or modifications for one skilled in the art may be implemented, still being under the scope of the invention as it is defined by the appended claims.

The invention claimed is:

1. A method for installing a cable into a duct having two extremities, the method comprising the steps of:
   determining a maximum pressure ($p_{max}$) based on a bursting or a service pressure of the duct, taking in account an installation temperature and/or an installation time,
   setting a leaking mode of a leaking plug to start at a leaking pressure drop ($\Delta p_{leak}$) across the leaking plug determined to be equal to or lower than the maximum pressure ($p_{max}$),
   attaching the leaking plug to a foremost end of the cable,
   introducing the foremost end of the cable into the duct at a first extremity of the two extremities,
   supplying a pressurized liquid into the duct:

at a supply port arranged between the foremost end equipped with the leaking plug and the first extremity, and at a supply pressure ($p_{sup}$) equal to or higher than a predetermined pressure, so that the cable is pulled by the leaking plug, before the foremost end has reached a second extremity of the two extremities, exceeding the leaking pressure drop ($\Delta p_{leak}$) at a location close to the leaking plug, leading the leaking mode to start.

2. The method according to claim 1, wherein the duct presents a trajectory with non constant altitude, the method comprising a step, before the foremost end has reached the second extremity, of adjusting the supply pressure ($p_{sup}$), so that all along the part of the duct comprised between the first extremity and the foremost end of the cable and filled with liquid, the pressure of the liquid is lower than the maximum pressure ($p_{max}$).

3. The method according to claim 2, wherein the supply pressure is adjusted, so that at any point along the part of the duct comprised between the first extremity and the foremost end of the cable and filled with liquid:

for points at higher altitude than the first extremity, the supply pressure ($p_{sup}$) subtracted with a pressure loss caused by liquid viscosity to reach said considered point, is greater than a hydrostatic pressure caused by the liquid density and a difference of altitude between the altitude of said considered point and the first extremity, and/or for points at lower altitude than the first extremity, the supply pressure ($p_{sup}$) subtracted with a pressure loss caused by liquid viscosity to reach said considered point, added to the hydrostatic pressure caused by the liquid density and a difference of altitude between the altitude of said considered point and the first extremity is larger than zero and lower than the maximum pressure ($p_{max}$).

4. The method according to claim 1, wherein:

if the second extremity positioned at a higher altitude than the first extremity, the supply pressure ($p_{sup}$) is adjusted so that the supply pressure ($p_{sup}$), subtracted with a pressure loss caused by liquid viscosity over all the duct's length and subtracted with the leaking pressure drop ($\Delta p_{leak}$), equal to a hydrostatic pressure caused by the liquid density and a difference of altitude between the altitude of said second extremity and the first extremity, or if the second extremity positioned at a lower altitude than the first extremity, the supply pressure ($p_{sup}$) is adjusted so that the supply pressure ($p_{sup}$), subtracted with a pressure loss caused by liquid viscosity over all the duct's length and subtracted with the leaking pressure drop ($\Delta p_{leak}$), and added to a hydrostatic pressure caused by the liquid density and a difference of altitude between the altitude of said second extremity and the first extremity is equal to 0.

5. The method according to claim 1, further comprising a step of supplying the pressurized liquid at a flow exceeding a leaking flow of the leaking plug, when the leaking mode has started.

6. The method according to claim 1, wherein, before the leaking mode has started, the pressurized liquid is supplied at a flow $\Phi_v$ as defined in formula:

$$\frac{1}{4}\pi(D_d^2 - D_c^2) \cdot v_{cable} \leq \Phi_V \leq \frac{1.2}{4}\pi(D_d^2 - D_c^2) \cdot v_{cable}$$

where:

$\Phi_v$ is the supplied flow of pressurized liquid (m³/s),
$D_c$ is the external diameter of the cable (m),
$D_d$ is the internal diameter of the duct (m),
$V_{cable}$ is the speed of the cable into the duct (m/s).

7. The method according to claim 1, wherein:

the two extremities are located at different altitudes, and
the foremost end of the cable is introduced at the first extremity of the duct, which is the extremity located at the highest altitude.

8. The method according to claim 1, wherein the leaking pressure drop ($\Delta p_{leak}$) is adjusted during the installation, and wherein:

the leaking pressure drop ($\Delta p_{leak}$) is increased before or gradually increased during the travelling of the leaking plug through an uphill portion of the duct, or the leaking pressure drop ($\Delta p_{leak}$) is reduced before or gradually reduced during the travelling of the leaking plug through a downhill portion of the duct.

9. The method according to claim 1, wherein the method comprises the initial steps of:

measuring or determining an internal diameter of the duct, an external diameter of the cable, and a slope of the duct between its extremities, setting a leaking surface of the leaking plug to be equal to or greater than a surface of a circular hole having a diameter $D_{hole}$:

$$D_{hole} \geq 1.8 \sqrt{\frac{D_{hydro}^{5/7} \rho_w^{9/14}}{\mu_w^{1/7} \Delta p_{leak}^{1/2}} [g \sin(\alpha)]^{4/7} (D_d^2 - D_c^2)},$$

With:

$$D_{hydro} = \frac{2}{1 + \sqrt{\frac{D_d - D_c}{D_d + D_c}}} (D_d - D_c)$$

where:

$D_c$ is the external diameter of the cable (m),
$D_d$ is the internal diameter of the duct (m),
$\Delta p_{leak}$ is the leaking pressure drop (Pa) across the leaking plug,
$\rho_w$ is the density of the pressurized liquid (kg/m³),
$\alpha$ is the average angle of the duct with the horizontal,
g is the acceleration of gravity (9.81 m/s²),
$\mu_w$ is the dynamic viscosity of the pressurized liquid (Pas).

10. The method according to claim 1, wherein the duct has an almost horizontal trajectory, and wherein the method comprises the initial steps of:

measuring or determining an internal diameter of the duct, an external diameter of the cable, setting a leaking surface of the leaking plug to be equal to or greater than a surface of a circular hole having a diameter $D_{hole}$:

$$D_{hole} \geq 1.8 \sqrt{\frac{D_{hydro}^{5/7} \rho_w^{9/14}}{\mu_w^{1/7} \Delta p_{leak}^{1/2}} (D_d^2 - D_c^2)}$$

With:

$$D_{hydro} = \frac{2}{1 + \sqrt{\frac{D_d - D_c}{D_d + D_c}}} (D_d - D_c)$$

where:
$D_c$ is the external diameter of the cable (m),
$D_d$ is the internal diameter of the duct (m),
$\Delta p_{leak}$ is the leaking pressure drop (Pa) across the leaking plug,
$\rho_w$ is the density of the pressurized liquid (kg/m³),
$\mu_w$ is the dynamic viscosity of the pressurized liquid (Pas).

11. The method according to claim 1, wherein the flow of the pressurized liquid supplied into the duct is:
set at a first flow value $\Phi_{v1}$ before the leaking mode has started,
set at a second flow $\Phi_{v2}$ after the leaking mode has started, wherein $\Phi N_{v2} \geq 5\Phi_{v1}$.

12. The method according to claim 1, comprising a step of changing a pump used to supply the pressurized liquid before the leaking mode starts.

13. The method according to claim 1, comprising:
a step of measuring a pressure at a location close to the leaking plug during installation,
a step of correcting the supply pressure ($p_{sup}$) according to the measured pressure at a location close to the leaking plug.

* * * * *

UNITED STATES PATENT AND TRADEMARK OFFICE
CERTIFICATE OF CORRECTION

| | | |
|---|---|---|
| PATENT NO. | : 11,909,185 B2 | Page 1 of 1 |
| APPLICATION NO. | : 16/976961 | |
| DATED | : February 20, 2024 | |
| INVENTOR(S) | : Willem Griffioen et al. | |

It is certified that error appears in the above-identified patent and that said Letters Patent is hereby corrected as shown below:

In the Claims

Column 15, Line 17, cancel the text beginning with "11. The method according to claim 1" to and ending "wherein $\Phi N_{v2} \geq 5\Phi_{v1}$." in Column 15, Line 22, and insert the following claim:
--11. The method according to claim 1, wherein the flow of the pressurized liquid supplied into the duct is:
- set at a first flow value $\Phi_{v1}$ before the leaking mode has started,
- set at a second flow $\Phi_{v2}$ after the leaking mode has started,
wherein $\Phi_{v2} \geq 5\Phi_{v1}$.--

Signed and Sealed this
Ninth Day of July, 2024

Katherine Kelly Vidal
*Director of the United States Patent and Trademark Office*